US008876932B2

(12) United States Patent
Machida et al.

(10) Patent No.: US 8,876,932 B2
(45) Date of Patent: Nov. 4, 2014

(54) POWER TOOL DUST COLLECTING DEVICE AND POWER TOOL

(75) Inventors: Yoshitaka Machida, Anjo (JP); Kiyonobu Yoshikane, Anjo (JP)

(73) Assignee: Makita Corporation, Anjo-shi (JP)

( * ) Notice: Subject to any disclaimer, the term of this patent is extended or adjusted under 35 U.S.C. 154(b) by 123 days.

(21) Appl. No.: 13/544,248

(22) Filed: Jul. 9, 2012

(65) Prior Publication Data

US 2013/0031881 A1 Feb. 7, 2013

(30) Foreign Application Priority Data

Aug. 4, 2011 (JP) ................................ 2011-171091
Aug. 31, 2011 (JP) ................................ 2011-189337

(51) Int. Cl.
*B23B 47/34* (2006.01)
*B01D 50/00* (2006.01)
*B23Q 11/00* (2006.01)

(52) U.S. Cl.
CPC .................................. *B23Q 11/0046* (2013.01)
USPC ............ 55/385.1; 173/198; 173/171; 408/58; 408/67

(58) Field of Classification Search
USPC ............ 55/385.1; 29/428; 173/198, 217, 197, 173/75, 97, 171; 408/58, 67; 175/209, 211
See application file for complete search history.

(56) References Cited

U.S. PATENT DOCUMENTS

| 7,017,680 | B2 | 3/2006 | Arich et al. | |
| 7,354,226 | B2 * | 4/2008 | Britz | 408/67 |
| 8,443,914 | B2 * | 5/2013 | Bito et al. | 173/198 |
| 2002/0141836 | A1 * | 10/2002 | Ege et al. | 408/67 |
| 2006/0107633 | A1 * | 5/2006 | Walker | 55/385.1 |
| 2007/0151075 | A1 * | 7/2007 | Izumisawa et al. | 16/110.1 |
| 2007/0210132 | A1 * | 9/2007 | Akiba | 227/10 |
| 2008/0169114 | A1 * | 7/2008 | Wuensch et al. | 173/198 |
| 2013/0199810 | A1 * | 8/2013 | Wyler | 173/162.2 |
| 2013/0289565 | A1 * | 10/2013 | Hassler, Jr. | 606/79 |

FOREIGN PATENT DOCUMENTS

| CN | 1299869 C | 2/2007 |
| EP | 1 714 733 A1 | 10/2006 |
| GB | 2340056 A | 2/2000 |
| JP | B2-3448110 | 9/2003 |

OTHER PUBLICATIONS

Extended European Search Report issued in European Patent Application No. 12176131.6 on May 13, 2013.
May 4, 2014 Notification of Opinion in the First Examination issued in Chinese Patent Application No. 2012102734250.0 (with English Translation).

* cited by examiner

*Primary Examiner* — Duane Smith
*Assistant Examiner* — Minh-Chau Pham
(74) *Attorney, Agent, or Firm* — Oliff PLC (57) ABSTRACT

A power tool dust collecting device includes a fan chamber and a dust collecting chamber. The fan chamber is formed in a housing which is mountable on a hammer drill and in which a suction opening is provided protrudingly. The fan chamber houses a fan that rotates in accordance with driving of a motor. The dust collecting chamber is formed on an upstream side of the fan chamber. Mounted on the dust collecting chamber is a filter through which passes air that has been sucked up from the suction opening by the rotation of the fan and which collects dust included in the air. An air pumping unit that pumps air from a downstream side of the filter toward an upstream side is provided inside the housing.

10 Claims, 8 Drawing Sheets

POWER TOOL DUST COLLECTING DEVICE AND POWER TOOL

BACKGROUND OF THE INVENTION

This application claims the benefit of Japanese Patent Application Number 2011-171091 filed on Aug. 4, 2011 and Japanese Patent Application No. 2011-189337 filed on Aug. 31, 2011, the entirety of which is incorporated by reference.

TECHNICAL FIELD

The present invention relates to a power tool dust collecting device that is mounted on a power tool, such as a power drill or a hammer drill etc., and to a power tool on which the power tool dust collecting device is mounted.

RELATED ART

In Japanese Patent No. 3448110, for example, a power tool is disclosed that is provided with a dust collecting device for collecting dust generated when concrete etc is cut. In the power tool disclosed in Japanese Patent No. 3448110, a suction mechanism having a filter collecting dust generated by cutting is detachably mounted on a main body of a device, and an inflow opening is provided in the suction mechanism, the inflow opening extending substantially at a right angle to a filter surface. According to the disclosed power tool, an airflow passing through the inflow opening flows along the filter surface inside the suction mechanism, and thus blows away dust generated by cutting that is attached to the filter surface.

However, in the above-described power tool, even if the dust attached to the filter surface can be temporarily blown away by the airflow passing through the inflow opening, dust etc. in the airflow may attach to the filter surface again. Thus, efficiency for removing the dust from the filter may deteriorate.

SUMMARY OF THE INVENTION

In light of the above, the present invention provides a power tool dust collecting device having improved efficiency when dust from a filter is removed, and a power tool on which the power tool dust collecting device is mounted.

A first aspect of the present invention provides a power tool dust collecting device including a housing mountable on the power tool, a suction opening protrudingly provided in the housing, a motor housed in the housing, a fan chamber which is formed in the housing and which houses a fan that rotates in accordance with driving of the motor, a dust collecting chamber provided in the housing on an upstream side of the fan chamber in which a filter through which air sucked up from the suction opening due to rotation of the fan passes is mounted and the filter collecting dust in the air, and an air pumping unit provided inside the housing pumping air from a downstream side toward an upstream side of the filter.

A second aspect of the invention is a configuration according to the first aspect, the air pumping unit is provided on the downstream side of the filter.

A third aspect of the invention is a configuration according to the first aspect; the air pumping unit includes a pressurizing unit that pressurizes the fan chamber.

A fourth aspect of the invention is a configuration according to the third aspect, the pressurizing unit includes an accordion-shaped pump which is expandable and compressable, and the pump pumps air into the fan chamber by compression.

A fifth aspect of the invention is a configuration according to the third aspect, a discharge opening for the air that has passed through the filter is formed in the fan chamber, and a shutter member capable of opening and closing the discharge opening is provided inside the housing.

A sixth aspect of the invention includes is a configuration according to the fifth aspect, an operation unit is provided so as to allow the expanding and compressing of the pump to be operated from outside of the housing, and the shutter member is movable to a closed position of the discharge opening in concert with the compression operation of the pump by the operation unit.

An eleventh aspect of the invention provides a power tool on which the power tool dust collecting device according to the first aspect of the invention is mounted.

According to the power tool dust collecting device of the first aspect of the invention and the power tool according to the eleventh aspect of the invention, air pumped by the air pumping unit flows in reverse from the downstream side to the upstream side of the filter and can thus blow away dust attached to the filter. As a result, efficiency of separating dust from the filter improves.

According to the second aspect of the invention, the air pumped by the air pumping unit to flow in reverse from the downstream side to the upstream side of the filter. As a result, dust that has attached to the filter can be effectively blown away.

According to the third aspect of the invention, pressure in the fan chamber rises due to pressurizing of the fan chamber by the pressurizing unit which enables blowing, which enables air from the fan chamber to blow onto the filter that is positioned on the upstream side of the fan chamber.

According to the fourth aspect of the invention, the fan chamber can be easily pressurized by simple operation of compressing the pump.

According to the fifth aspect of the invention, by closing the discharge opening of the fan chamber with the shutter member, air pumped into the fan chamber is prevented from leaking out through the discharge opening.

According to the sixth aspect of the invention, when the air is pumped into the fan chamber by the compression operation of the pump using the operation unit, the discharge opening formed in the fan chamber can be closed by using the shutter member. As a result, inside of the fan chamber can be efficiently pressurized using the air pumped from the pump.

DETAILED DESCRIPTION OF THE EMBODIMENTS

<First Embodiment>

Figure 1:
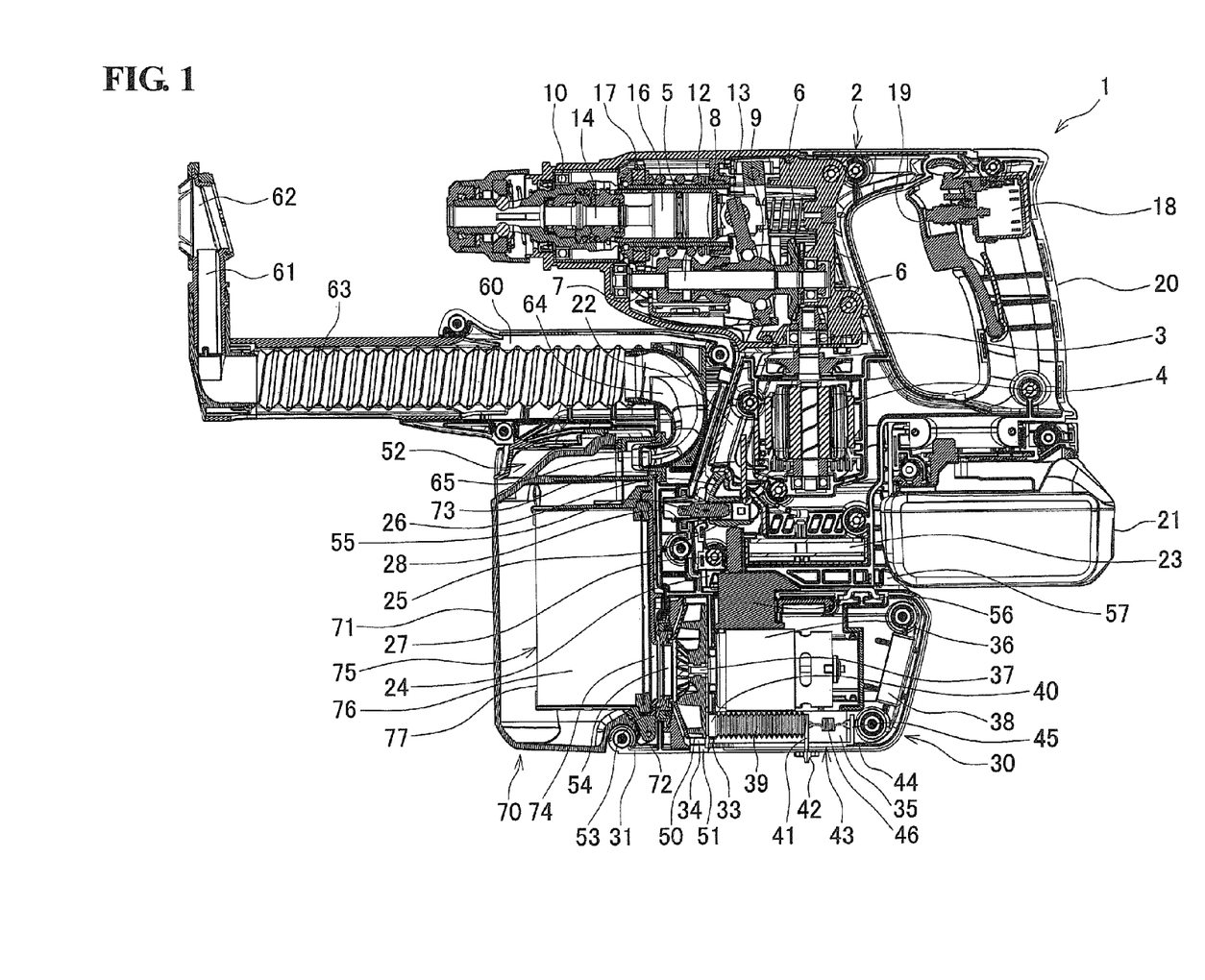
FIG. 1 is a vertical cross-sectional view of a hammer drill on which is mounted a power tool dust collecting device according to a first embodiment of the present invention.
Figure 2:
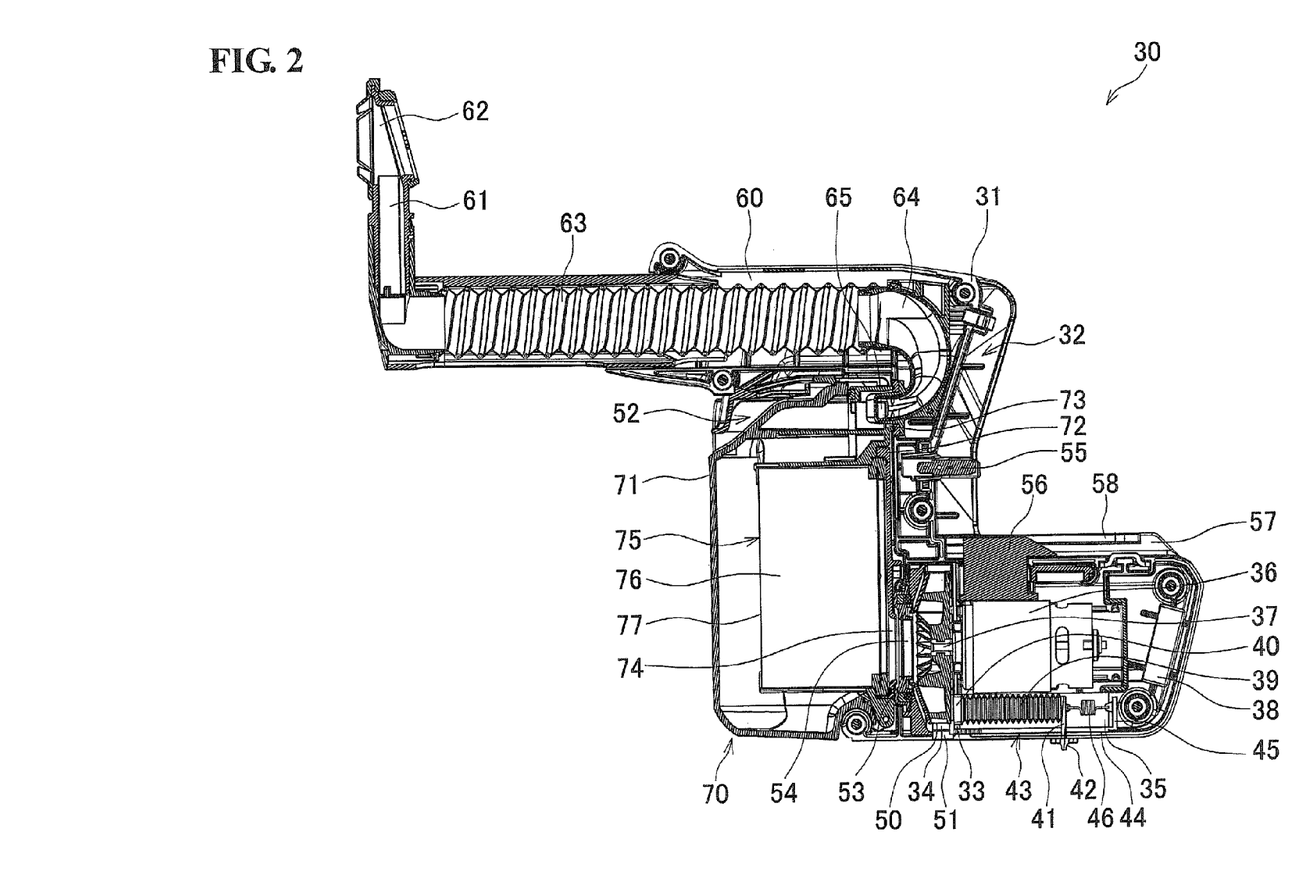
FIG. 2 is a vertical cross-sectional view of the power tool dust collecting device.
Figure 3:
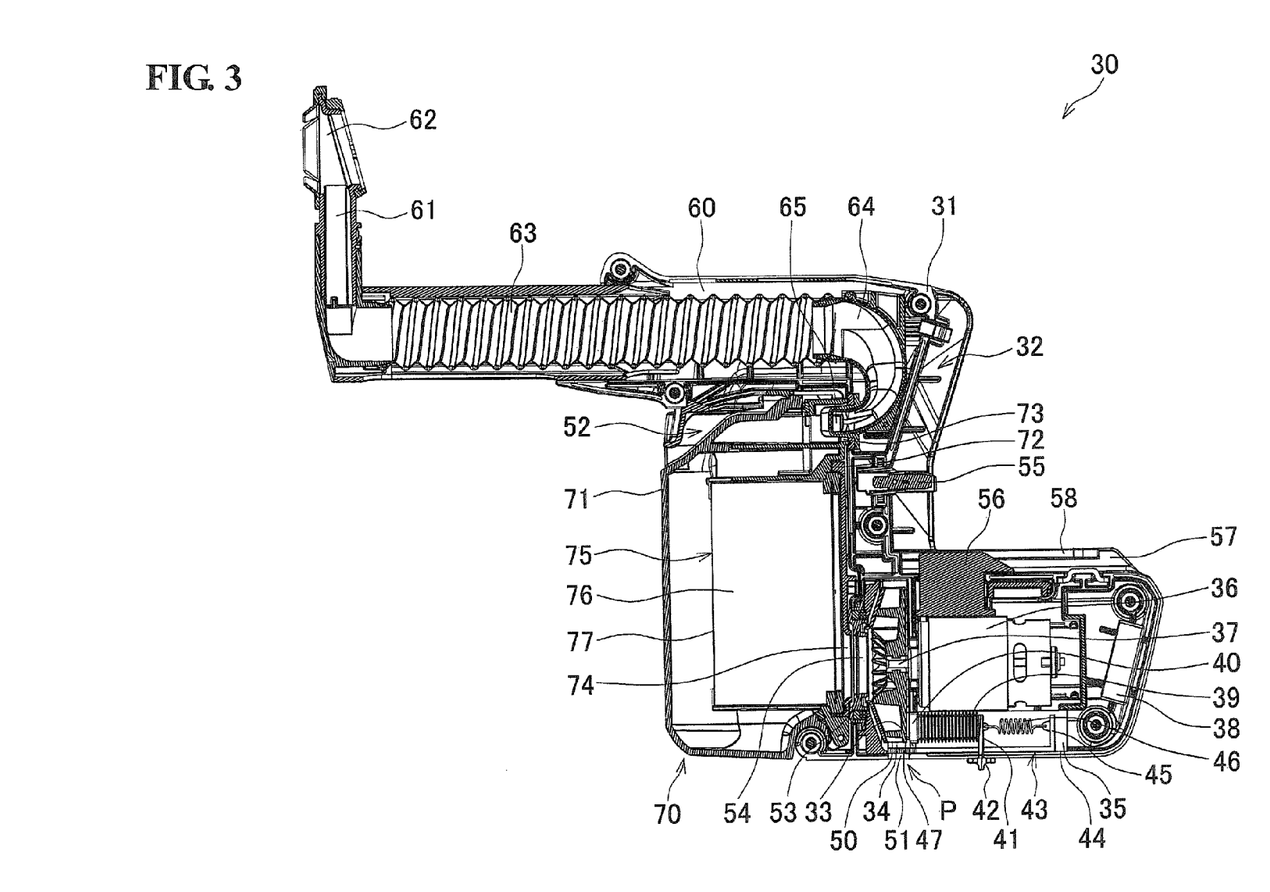
FIG. 3 is a view illustrating an operation of the power tool dust collecting device in which a pump is compressed and pressurizes a fan chamber.

A first embodiment of the present invention will be explained with reference to FIG. 1 to FIG. 3. FIG. 1 shows a state in which a power tool dust collecting device 30 is mounted on a hammer drill 1, and FIG. 2 shows the power tool dust collecting device 30 (hereinafter referred to as the dust collecting device 30). The hammer drill 1 is an example of a power tool of the present invention, and is provided with a main housing 2 made of resin. The left side in FIG. 1 is the front side of the main housing 2 and the right side in FIG. 1 is the rear side of the main housing 2. As shown in FIG. 1, a motor 4 having an upwardly facing output shaft 3 is housed in the lower portion on the front side inside the main housing 2. Above the output shaft 3 inside the main housing 2, a countershaft 5 is axially supported in a direction intersecting with the output shaft 3, and torque is transmitted from the output shaft 3 to the countershaft 5 via bevel gears 6. The countershaft 5 has a first gear 7, a clutch 8 and a boss sleeve 9 in that order from the front side. Above the countershaft 5, a tool holder 10 is axially supported in parallel with the countershaft 5 and a bit (not shown in the drawings) can be inserted into a leading end of the tool holder 10. A piston cylinder 12 is loosely inserted on the rear side of the tool holder 10, and an arm attached to the boss sleeve 9 is coupled to the rear end of the piston cylinder 12. An impact bolt 14 is housed inside the piston cylinder 12 on the front side, and a striker 16 striking the impact bolt 14 is housed to the rear side of the impact bolt 14. Both the impact bolt 14 and the striker 16 are housed such that they can move in the front-rear direction. The first gear 7 meshes with a second gear 17 that is mounted on the tool holder 10.

Further, as shown in FIG. 1, a handle 20 having a switch 18 and a switch lever 19, is provided on the upper portion on the rear side of the main housing 2, and a battery pack 21, as a power source, is mounted below the handle 20. In addition, the front surface of the lower portion on the front side of the main housing 2 inclines downward to the front so as to protrude in front of the battery pack 21, and forms a mounting portion 22 on which the dust collecting device 30 is mounted. A controller 23 is housed in the interior of the mounting portion 22, and a coil of the motor 4, the switch 18 and the battery pack 21 are electrically connected to the controller 23. Further, a guiding groove 24 is formed as a depression extending in the front-rear direction in the center, in the left-right direction, of the underneath surface of the mounting portion 22 such that the front end of the guiding groove 24 opens to the front side.

A connector 25 is provided on the upper portion on the front side of the controller 23 in the mounting portion 22. The connector 25 has three female terminals, for a power source and for communication, arranged in a row at a predetermined interval in the left-right direction. The connector 25 has a rectangular cylinder shape that is open at the front side, and a shutter portion 26 is integrally formed with the upper surface front end of the connector 25 such that the shutter portion 26 is oriented upward. Further, in the center of the underneath surface of the mounting portion 22, below the connector 25, a pressing piece 27 is supported so as to move in the up-down direction.

In addition, a square-shaped socket 28 is formed on the front side of the connector 25, as an opening in the front surface of the mounting portion 22. The connector 25 can be rotated to a connected position and a non-connected position. The connected position is a position in which the shutter portion 26 withdraws to the upper side of the socket 28 and the opening is positioned directly behind the socket 28. The non-connected position is a position in which the shutter portion 26 is positioned directly behind the socket 28 and the opening is caused to withdraw below the socket 28. It should be noted that, when the dust collecting device 30 is not mounted on the hammer drill 1, the connector 25 is rotationally urged, by a torsion spring that is not shown in the drawings, to the non-connected position in which the shutter portion 26 blocks the socket 28. In the non-connected position, the pressing piece 27 is pressed by the connector 25 that has withdrawn to the lower side, protrudes into the guiding groove 24, penetrating the mounting portion 22

The dust collecting device 30 includes a housing 31 having an L shape in a side view, as shown in FIG. 2. In FIG. 2, the left side is the front side of the housing 31 and the right side is the rear side of the housing 31. An engagement recess portion 32 engaging with the mounting portion 22 of the hammer drill 1 is provided in the upper portion on the rear side of the housing 31. The rear side of the housing 31 is partitioned by a partition member 33 into a fan chamber 34 and a motor housing chamber 35 that are adjacent to each other in the front-rear direction of the housing 31.

A motor 36 is housed in the motor housing chamber 35 such that an output shaft 37 faces toward the front side and the motor 36 is oriented sideways. Further, a controller 38 is housed in the motor housing chamber 35, on the rear side of the motor 36. A pump 39 is additionally housed in the motor housing chamber 35, and an accordion-shaped body of the pump 39 is oriented sideways on the lower side of the motor 36 such that the accordion-shaped body can freely expand and contract. An exhaust outlet 40 for air is formed on the front end of the pump 39, being connected with an opening (not shown in the drawings) of the partition member 33, so that the exhaust outlet 40 communicatively connects with the fan chamber 34. Meanwhile, an operation plate 41 extending downward is fixed to the rear end of the pump 39, and the leading end of the operation plate 41 protrudes to the outside of the housing 31 through a slit (not shown in the drawings) which is opened in the front-rear direction in the underneath surface of the housing 31. An operation grip 42 is attached to the leading end of the operation plate 41.

As shown in FIG. 2, a shutter member 43 having a reverse L shape in a side view is housed in the motor housing chamber 35 such that the shutter member 43 can slide in the front-rear direction of the housing 31 along a rib 44 which extends in parallel to the underneath surface of the motor housing chamber 35. While sliding to the front side, the shutter member can penetrate the partition member 33 and enter into the fan chamber 34. A vertical portion 45 of the shutter member 43 is connected to the operation plate 41 via a coil spring 46. In the normal state shown in FIG. 2, the pump 39 is in an expanded state and the shutter member 43 opens an air discharge opening 51 of the fan chamber 34, which will be described later.

Further, the output shaft 37 enters into the fan chamber 34 from the opening in the partition member 33. A fan 50 fixed to the output shaft 37 is housed in the fan chamber 34. The air discharge opening 51, which communicatively connects the outside of the dust collecting device 30 and the fan chamber 34, is opened in the underneath surface of the fan chamber 34. In addition, a coupling portion 52 of a dust box 70, which will be described later, is provided on the upstream side of the fan chamber 34 in the housing 31. The coupling portion 52 has a recessed shape in which the front side only is open, and a communicating hole 54 is formed in a partition wall 53 that forms the bottom of the coupling portion 52. The communication hole 54 is provided coaxially with the fan 50 such that the coupling portion 52 is communicatively connected with the fan chamber 34.

Further, three plate-shaped male terminals 55, for a power source and for communication wiring, are arranged in a row at a predetermined interval on the rear surface of the upper portion of the housing 31 such that they protrude to the rear side. On the upper surface of the rear portion of the housing 31, a pressure rail 56 that engages with the guiding groove 24 in the mounting portion 22 of the hammer drill 1 is provided protrudingly in the front-rear direction of the housing 31. An inclined surface is formed on the rear end of the pressure rail 56, a height of the inclined surface becoming lower the further to the rear side. A pair of guide rails 57 is provided in a standing manner in the front-rear direction on both the left and right sides of the pressure rail 56, at an interval allowing the lower portion of the mounting portion 22 to be engaged. On the upper edge of each of the guide rails 57, a protrusion 58 is provided protrudingly toward the inner side and the protrusion 58 can be engaged with a coupling groove (not shown in the drawings) formed in a side surface of the mounting portion 22.

Above the coupling portion 52 in the housing 31, a guide passage 60 is formed in the front-rear direction of the housing 31. The front side of the guide passage 60 is open and the rear side turns in a U shape and wraps around to the rear of the coupling portion 52. A nozzle 61 having an L shape in a side view is coupled to the front end of the guide passage 60, and a suction opening 62 that is provided on the leading end of the nozzle 61 is caused to protrude upwardly from the housing 31. A flexible hose 63 is housed in the nozzle 61 and the guide passage 60 so as to extend through both the nozzle 61 and the guide passage 60, and a duct 64 is coupled to the rear end of the flexible hose 63. The duct 64 has a cylinder shape folded back in a U shape along the shape of the rear end of the guide passage 60. An exhaust outlet 65 opens on the rear end of the duct 64, and the exhaust outlet 65 penetrates the partition wall 53 and protrudes into the coupling portion 52.

As shown in FIG. 2, the dust box 70 having a cuboid box body 71 and a lid 72 is detachably mounted on the coupling portion 52. The lid 72 is hinge jointed to an opening of the box body 71. An inlet 73 is formed on the side of one end of the lid 72 in the up-down direction, and an outlet 74 is formed on the side of the other end of the lid 72. Inside the dust box 70, a filter unit 75 is positioned to cover the outlet 74, and is mounted such that a filter surface 77 of a paper filter 76 protrudes. When the dust box 70 is mounted on the coupling portion 52, the rear end of the duct 64 is fitted into the inlet 73, the exhaust outlet 65 protrudes into the dust box 70 and the outlet 74 faces the communicating hole 54.

Next, an operation will be explained in which the dust collecting device 30 is mounted on the hammer drill 1 and dust from a material being processed is being collected. When the dust collecting device 30 is mounted on the hammer drill 1, the lower portion of the mounting portion 22 of the hammer drill 1 is aligned with the guide rails 57 of the housing 31 and the mounting portion 22 is positioned above the rear portion of the housing 31. Consequently, the dust collecting device 30 slides toward the rear such that the engagement recess portion 32 engages with the mounting portion 22 from the front. Then, the pressure rail 56 of the dust collecting device 30 is engaged with the guiding groove 24 of the mounting portion 22 and slides to the rear side. At this time, the protrusion 58 of each guide rails 57 is engaged with the coupling groove of the mounting portion 22 and slides to the rear side. Then, the pressure rail 56 comes into contact with the pressing piece 27 and the inclined surface of the pressure rail 56 pushes the pressing piece 27 in the upward direction. The connector 25 moves to the connected position in which the shutter portion 26 withdraws in the upward direction and the opening is positioned directly behind the socket 28. Then, the male terminals 55 of the dust collecting device 30 enter into the main housing 2 of the hammer drill 1 from the opened socket 28. Further, when the mounting portion 22 is engaged with the engagement recess portion 32, simultaneously the male terminals 55 are inserted into the female terminals, and electronically connected.

When the switch 18 is switched on by pushing to operate a switch lever 19 of the hammer drill 1, the motor 4 is driven and rotates the countershaft 5. At that time, by a slide operation of the clutch 8 from the outside of the main housing 2, a position is selected from among a forward position in which the clutch 8 only engages with the first gear 7, a backward position in which the clutch 8 only engages with the boss sleeve 9, and an intermediate position in which the clutch 8 engages with the first gear 7 and the boss sleeve 9 simultaneously. By this selection, it is possible to select between three modes, which are a drill mode in which the tool holder 10 is rotated via the second gear 17 and rotates the bit, a hammer mode in which the piston cylinder 12 moves reciprocatingly by oscillation of the arm 13 and the interlocked striker 16 strikes the bit via the impact bolt 14, and a hammer drill mode in which the rotation of the tool holder 10 and the striking of the bit are performed simultaneously.

Meanwhile, when the switch 18 is on, the controller 23 supplies power to the controller 38 of the dust collecting device 30 to drive the motor 36 and rotate the fan 50. When the fan 50 starts rotating, outside air sucked in from the suction opening 62 of the nozzle 61 passes through the flexible hose 63 and the duct 64, and is lead into the dust box 70 through the exhaust outlet 65. The air lead into the dust box 70 flows to the front side of the filter unit 75 and passes from the filter surface 77 through the filter 76. Further, the air that has passed through the filter 76 reaches the fan chamber 34 from the outlet 74 via the communicating hole 54, and is discharged to the outside of the fan chamber 34 from the air discharge opening 51. Thus, the dust arising from the bit from the drilling location of the material being processed is sucked up by the suction opening 62 along with the outside air and enters into the dust box 70, where the dust is trapped by the filter 76 and retained. It should be noted that the dust box 70 is an example of a dust collecting chamber of the present invention, and the air discharge opening 51 is an example of a discharge opening of the present invention.

The dust that has been trapped by the filter 76 may cause clogging of the filter 76. In the present embodiment, the clogging of the dust can be prevented because the dust trapped in the filter 76 is blown away by operation of the pump 39 after the switch 18 has been off as explained below.

When the operation grip 42 shown in FIG. 2 is moved in the front-rear direction from outside the housing 31, the operation plate 41 fixed to the rear end of the pump 39 also moves in the front-rear direction. As a result, the pump 39 is expanded and contracted as shown in FIG. 2 and FIG. 3. Compression of the pump 39 using the operation grip 42, air is pumped into the fan chamber 34 from the exhaust outlet 40 of the pump 39. At this time, as shown in FIG. 3, because the operation plate 41 is connected to the vertical portion 45 of the shutter member 43 via the coil spring 46, in concert with the movement of the operation plate 41 in the front-rear direction, a horizontal portion 47 of the shutter member 43 penetrates the partition member 33 and moves to a closed position P, which is a position in which the air discharge opening 51 is closed. In this way, the air pumped into the fan chamber 34 from the pump 39 is prevented from leaking out through the air discharge opening 51. It should be noted that the operation plate 41 and the operation grip 42 are one example of an operation unit of the present invention.

Due to the air lead from the pump 39, the fan chamber 34 is in a pressurized state in which the air pressure in the fan chamber 34 has risen. As a result, from the fan chamber 34 in the pressurized state, air is lead through the communication hole 54 and the outlet 74 into the dust box 70. After that, the air lead into the dust box 70 flows in reverse, from the downstream side toward the upstream side. In the present embodiment, as the pump 39 is housed in the motor housing chamber 35 arranged on the downstream side of the filter 76, the air pumped from the pump 39 flows in the reverse direction. After the dust trapped in the filter 76 has been blown off from the filter 76 by the reverse flowing air, the dust is collected inside the dust box 70. It should be noted that the pump 39 is an example of an air pumping unit and a pressurizing unit of the present invention.

<Effects of First Embodiment>

In the dust collecting device 30 of the present embodiment and the hammer drill 1 on which the dust collecting device 30 is mounted, the dust that has been trapped in the filter 76 can be blown away by the air pumped out by the pump 39 flowing in the reverse direction, from the downstream side to the upstream side of the filter 76. Thus, removing of the dust from the filter 76 can be efficiently performed.

Furthermore, as the pump 39 is housed in the motor housing chamber 35 arranged on the downstream side of the filter 76, the air pumped from the pump 39 flows in the reverse direction, from the downstream side to the upstream side of the filter 76. As a result, the dust trapped in the filter 76 can be effectively blown away.

In addition, the fan chamber 34 is pressurized by the pump 39 and thus the air pressure in the fan chamber 34 rises, which enables to blow air from the fan chamber 34 onto the filter 76 positioned on the upstream side of the fan chamber 34.

Additionally, the fan chamber 34 can easily be pressurized by a simple operation that compresses the pump 39.

Furthermore, as the air discharge opening 51 formed in the fan chamber 34 is closed using the horizontal portion 47 of the shutter member 43, the air pumped into the fan chamber 34 by the pump 39 is prevented from leaking from the air discharge opening 51.

Further, when the pump 39 is compressed using the operation grip 42 and the operation plate 41 and the pump 39 pumps air into the fan chamber 34, the air discharge opening 51 formed in the fan chamber 34 is closed using the horizontal portion 47 of the shutter member 43. As a result, the fan chamber 34 can be efficiently pressurized by the air pumped from the pump 39.

The present invention is not limited to the above-described embodiment, and a part of the structure can be modified as appropriate insofar as it is within the scope of the present invention. For example, in contrast to the above-described first embodiment, in place of the pump 39, a cylinder may be used in which a piston is movably inserted, and the fan chamber 34 may be pressurized by air being expelled from the cylinder by the movement of the piston.

Furthermore, instead of closing the air discharge opening 51 by the shutter member 43, the air discharge opening 51 can be manually closed, for example, when the fan chamber 34 is pressurized. In addition, in contrast to the above-described first embodiment, a dust box may be supported by a hinged support on the dust collecting device 30, so that the dust box can freely rotate and a filter can be replaced. Additionally, in the above-described embodiment, the dust collecting device 30 is mounted on the hammer drill 1, however, the present invention is not limited to this example and the present invention may be applied to a power tool, such as a power drill, as long as a dust collecting device can be mounted.

<Second Embodiment>

Hereinafter, a second embodiment of the present invention will be explained based on the drawings.

Figure 4:
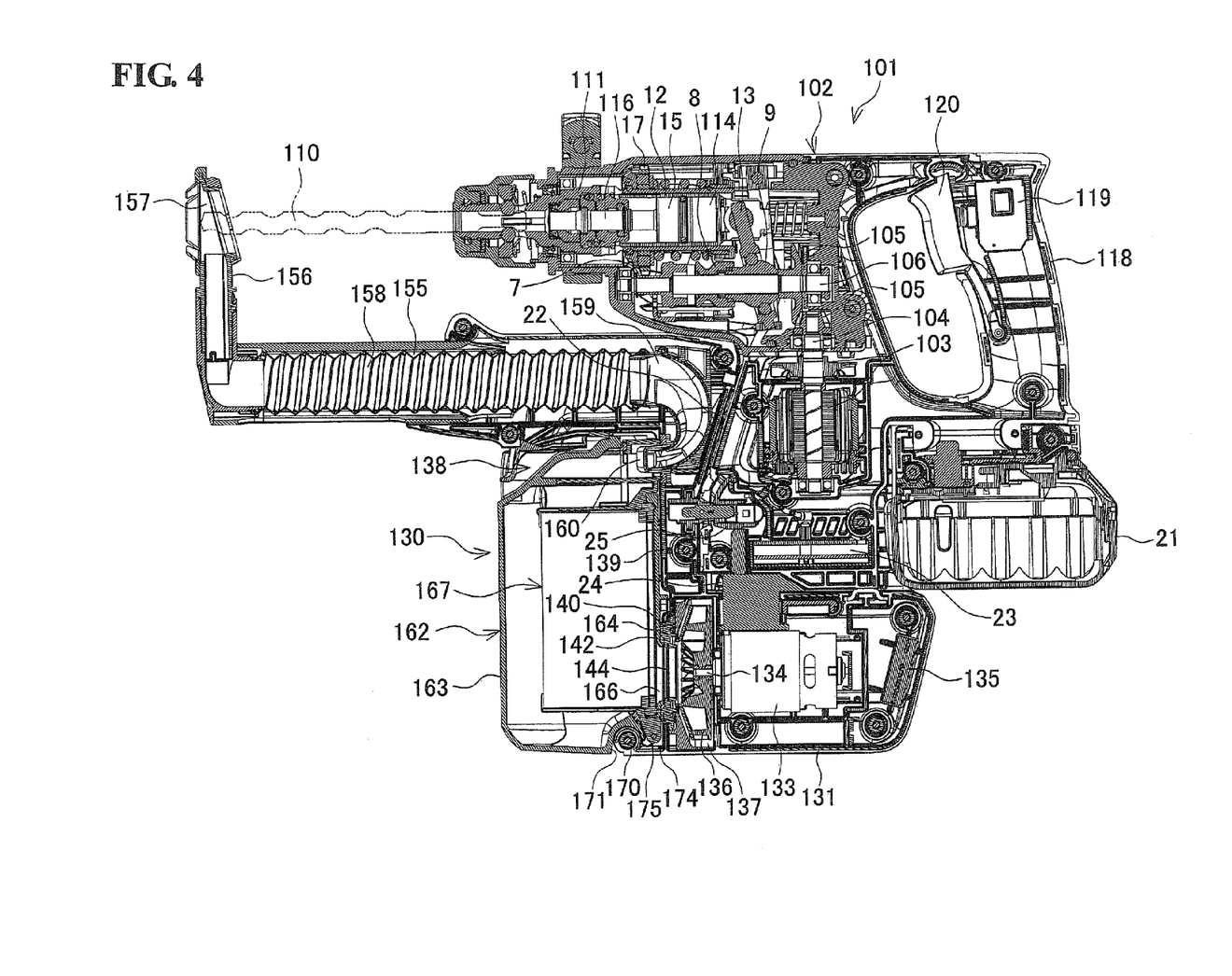
FIG. 4 is a vertical cross-sectional view of a hammer drill on which is mounted a power tool dust collecting device according to a second embodiment.

FIG. 4 shows a cross-section in which a power tool dust collecting device (hereinafter simply referred to as a "dust collecting device") is mounted on a hammer drill that is an example of a power tool.

First, a hammer drill 101 includes a motor 103 that is accommodated in the lower portion of the front side (the front is the left side in FIG. 4) of a housing 102 formed by assembling a left and right pair of half housings. An output shaft 104 of the motor 103 faces in the upward direction. Torque is transmitted from the output shaft 104 to a countershaft 106, via bevel gears 105, 105 that are positioned above the output shaft 104. The countershaft 106 is provided with the first gear 7, the clutch 8 and the boss sleeve 9 in that order from the front side. Above the countershaft 106, a tool holder 111 is axially supported in parallel with the countershaft 106 and a bit 110 can be inserted into a leading end of the tool holder 111. The piston cylinder 12 is loosely inserted on the rear side of the tool holder 111 and the arm 13 that is attached to the boss sleeve 9 via a swash bearing is coupled to the rear end of the piston cylinder 12. Inside the piston cylinder 12, a striker 15 is provided so as to move in the front-rear direction via an air chamber 114, and such that it can strike an impact bolt 116 provided to the front of the striker 15. The first gear 7 meshes with the second gear 17 mounted on the tool holder 111.

Further, a handle 118 having a switch 119 and a switch lever 120, is formed on the upper portion on the rear side of the housing 102, and the battery pack 21, which is the power source, is mounted below the handle 118. In addition, the front surface of the lower portion on the front side of the housing 102 inclines downward and to the front so as to protrude in front of the battery pack 21, and forms the mounting portion 22 on which a dust collecting device 130 is mounted. The controller 23 is housed in the interior of the mounting portion 22, and a coil of the motor 103, the switch 119 and the battery pack 21 are electrically connected to the controller 23. In addition, the guiding groove 24 is formed as a depression extending in the front-rear direction in the center, in the left-right direction, of the underneath surface of the mounting portion 22 such that the front end of the guiding groove 24 opens to the front side.

Figure 5:
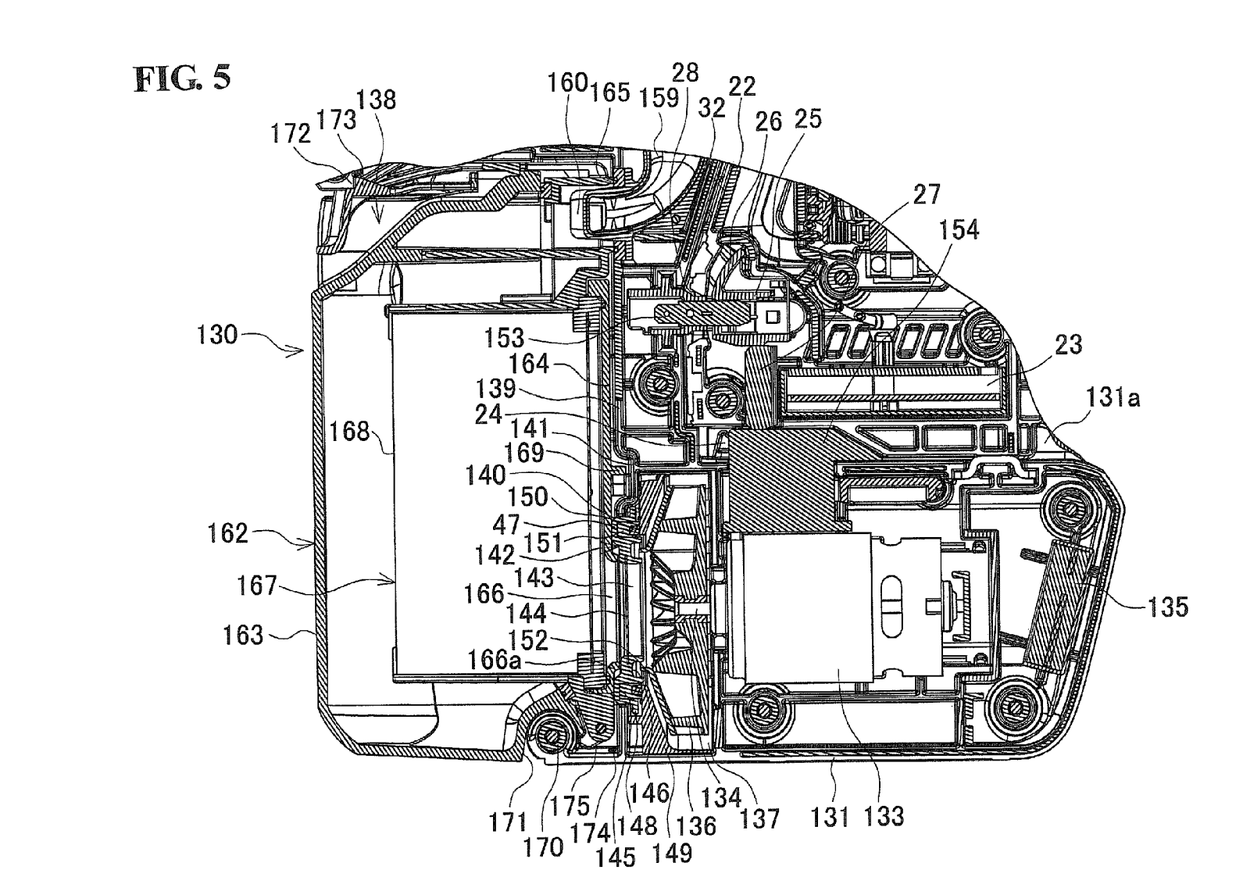
FIG. 5 is an enlarged cross-sectional view of a coupling portion of a dust box.

As also shown in FIG. 5, the connector 25 is provided on the upper portion on the front side of the controller 23, and the connector 25 has the three female terminals, for the power source and for communication, arranged in a row in the left-right direction. The connector 25 has the rectangular cylinder shape that is open at the front side, and the connector 25 is supported such that it can rotate in the up-down direction around a boss, by engaging a recessed portion (not shown in the drawings) formed on left and right outer surfaces of the connector 25 with a boss (not shown in the drawings) provided protrudingly on an inner surface of the left and right half housings. In addition, the shutter portion 26 is integrally formed with the front end of the upper surface of the connector 25 such that the shutter portion 26 is oriented upward. The shutter portion 26 is an arc-shaped plate with the boss at the center. Further, in the center of the underneath surface of the mounting portion 22, below the connector 25, the pressing piece 27 is supported such that it can move in the up-down direction.

In addition, the square-shaped socket 28 is formed as an opening in the front surface of the mounting portion 22, on the front side of the connector 25. The connector 25 can be rotated to the upper side connected position, in which the shutter portion 26 withdraws to the upper side of the socket 28 and the opening is positioned directly behind the socket 28, and to the non-connected position in which the shutter portion 26 is positioned directly behind the socket 28 and the opening is caused to withdraw below the socket 28. It should be noted that, in a state in which the dust collecting device 130 is not mounted, the connector 25 is rotationally urged, by a torsion spring that is not shown in the drawings, to the non-connected position in which the shutter portion 26 blocks the socket 28. In the non-connected position, the pressing piece 27 is pressed by the connector 25 that has withdrawn to the lower side, penetrates the mounting portion 22 and protrudes into the guiding groove 24.

Figure 6:
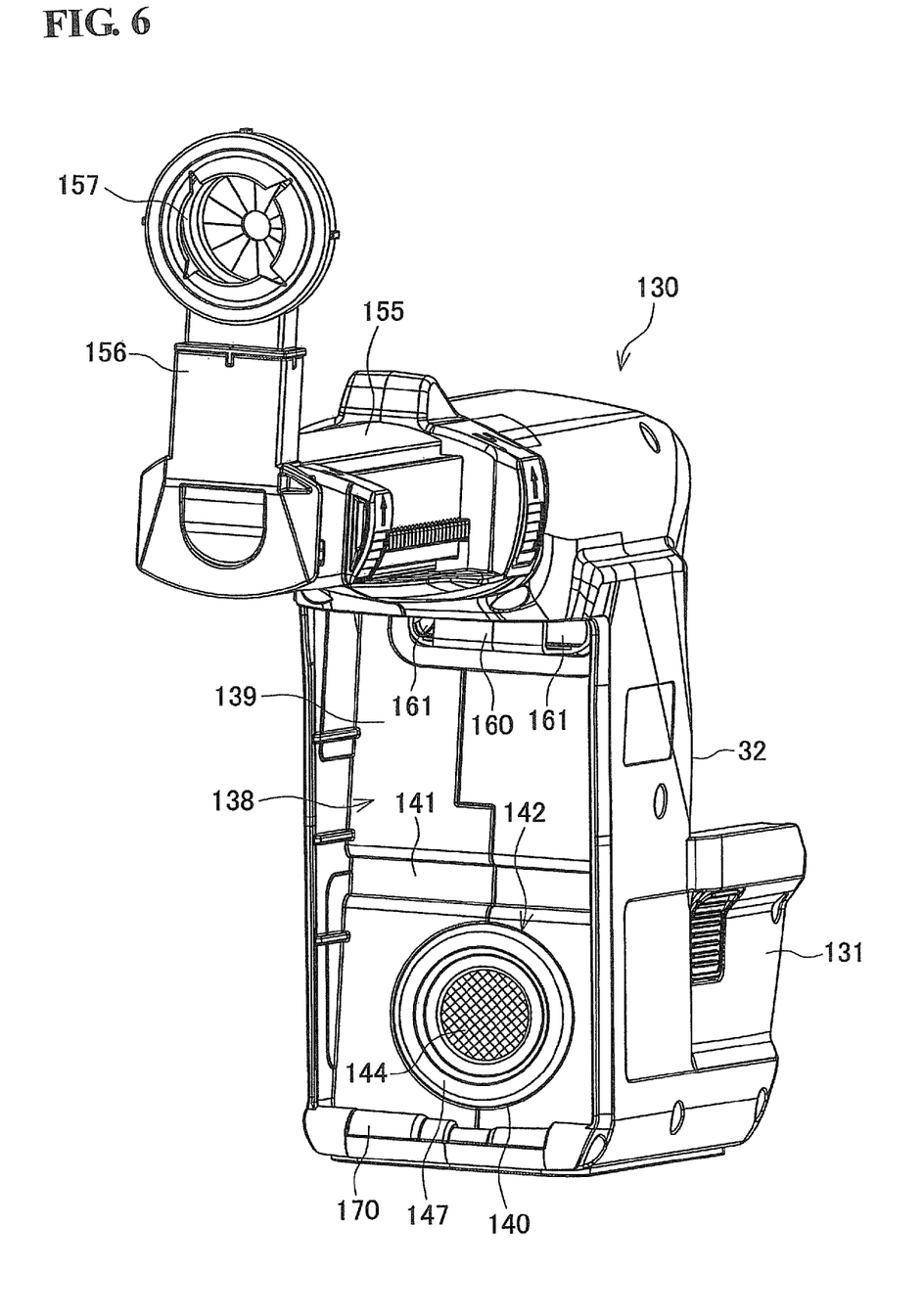
FIG. 6 is a perspective view of the power tool dust collecting device of the second embodiment.

The dust collecting device 130 includes a casing 131 having an L shape in a side view, the casing 131 being formed by assembly of left and right half casings. The engagement recess portion 32 that engages with the mounting portion 22 of the hammer drill 101 is formed in the right upper portion of the casing 31. A motor 133 is housed in the rear of the casing 131 such that an output shaft 134 faces toward the front and the motor 133 is oriented sideways. Further, a controller 135 is provided to the rear of the motor 133. A dust collecting fan 136 is fixed to the output shaft 134, and the dust collecting fan 136 is housed inside an air intake chamber 137 that is formed by partitioning inside the casing 131. A side surface of the air intake chamber 137 has an air exhaust opening that is not shown in the drawings. A coupling portion 138 is a dust box coupling portion that is formed in the casing 131 in front of the air intake chamber 137, and is a recessed shape that is open at the front only, as shown in FIG. 6. A communicating hole 140 is fondled in a partition wall 139 that is the bottom of the coupling portion 138. The communicating hole 140 is provided coaxially with the dust collecting fan 136 and causes the coupling portion 138 to communicate with the air intake chamber 137. Further, a recessed portion 141 extending in the left-right direction and protruding to the side of the air intake chamber 137 is formed above the communicating hole 140 in the partition wall 139.

In addition, a seal ring 142 as a seal member is fitted into the communicating hole 140. The seal ring 142 is made of a synthetic resin, and a wire mesh 144 is fitted into a central through hole 143. On a surface on the side of the air intake chamber 137, an outer groove 145 and an inner groove 146 are each formed concentrically with the through hole 143, while a ring-shaped protrusion 147 that is positioned on an outer side of the outer groove 145 is formed concentrically with the through hole 143, on a surface on the opposite side from the air intake chamber 137. Here, the outer diameter of the protrusion 147 is substantially matches the inner diameter of the communicating hole 140, and a flange 148 is provided around the outer periphery of the protrusion 147. A cover 149 is a fan cover provided in the air intake chamber 137 between the partition wall 139 and the dust collecting fan 136, and a ring shaped protruding portion 150 is formed in the center of the fan cover 149 such that the protruding portion 150 is concentric with the communicating hole 140. By fitting the protruding portion 150 into the outer groove 145 of the seal ring 142 via a rubber ring 151, the seal ring 142 is maintained in a state in which the flange 148 comes into contact with the partition wall 139 from the side of the air intake chamber 137, and the protrusion 147 is caused to protrude from the partition wall 139 to the outside. In this state, a leading end of an air intake opening 152 that is formed in the center of the dust collecting fan 136 is inserted into the inner groove 146.

Further, three plate-shaped male terminals 153, for a power source and for communication, are arranged in a row at a predetermined interval on the rear surface of the upper portion of the casing 131 such that they protrude to the rear side.

In addition, on the upper surface of the rear portion of the casing 131, a pressure rail 154 engaging with the guiding groove 24 in the mounting portion 22 is provided protrudingly in the front-rear direction of the casing 131. An inclined surface is formed on the rear end of the pressure rail 154, a height of the inclined surface becoming lower the further to the rear side. A pair of guide rails 131a is provided in a standing manner in the front-rear direction on both left and right sides of the pressure rail 154, at an interval allowing the lower portion of the mounting portion 22 to be engaged. On the upper edge of each guide rails 131a, protrusions (not shown in the drawings) are each formed toward an inner side, and each protrusion can be engaged with a coupling groove (not shown in the drawings) formed in a side surface of the mounting portion 22.

Meanwhile, in FIG. 5, above the coupling portion 138, a guide passage 155 is formed in the front-rear direction, such that the front side of the guide passage 155 is open and the rear side turns in a U shape and wraps around to the rear of the coupling portion 138. An n L shaped nozzle 156 is coupled to the front end of the guide passage 155 and the nozzle 156 has a suction opening 157 on the leading end of the nozzle 156 to protrude upwardly. A flexible hose 158 is housed in the nozzle 156 and the guide passage 155 such that it extends through both the nozzle 156 and the guide passage 155, and a duct 159 is coupled to the rear end of the flexible hose 158. The duct 159 has a cylinder shape that is folded back in a U shape along the shape of the rear end of the guide passage 155. The duct 159 is formed such that the upper side is a round cylinder and the lower side is a rectangular cylinder that is long in the horizontal direction. A leading end portion 160 on the lower side branches into a V shape in the left and right directions, and a pair of left and right exhaust outlets 161 are caused to open diagonally toward the front. When the duct 159 is attached, the leading end portion 160 penetrates the partition wall 139 and protrudes inside the coupling portion 138.

Figure 7:
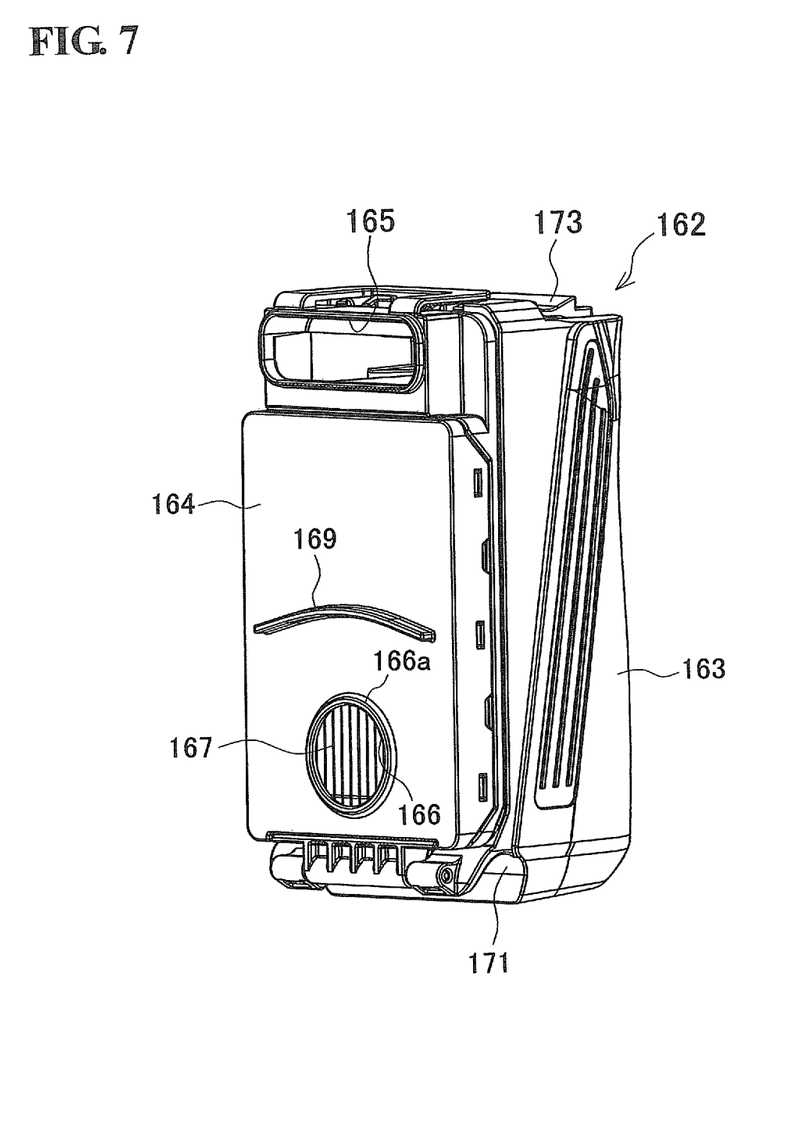
FIG. 7 is a perspective view of the dust box.

On the other hand, a dust box 162 is detachably mounted on the coupling portion 138. As also shown in FIG. 7, the dust box 162 includes a cuboid box body 163 and a lid 164 functioning as a cover that is hinge jointed to an opening of the box body 163. A rectangular inlet 165 that is long in the horizontal direction is formed on one side of the lid 164 in the lengthwise direction, while a circular outlet 166 is formed on the other side. At the same time, a filter unit 167 having a folded paper filter is provided in a position to cover the outlet 166 such that a filter surface 168 protrudes inside the box body 163. A standing portion 166a is formed around the whole circumference of the circumferential edge of the outlet 166 so as to protrude further to the outside than the outer surface of the lid 164.

Further, an arc-shaped rib 169 is provided protrudingly on the outer surface of the lid 164 between the inlet 165 and the outlet 166. In the vertical posture shown in FIG. 7, the rib 169 is provided in the left-right direction and a central portion in the left-right direction is closest to the inlet 165. The rib 169 has a length greater than the diameter of the outlet 166.

In addition, a groove 171 is formed in one end surface of the box body 163 in the widthwise direction, the groove 171 fitting with a bearing shaft 170 that is provided in the left-right direction in the lower end of the coupling portion 138. A latching piece 173 is formed on the other end surface of the box body 163, the latching piece 173 latching elastically with a latching protrusion 172 provided on the inner surface on the upper side of the coupling portion 138.

Meanwhile, a support portion 174 is provided protrudingly on the casing 131, and supports the bearing shaft 170 further to the front of the partition wall 139. A plurality of discharge holes 175 are formed in the support portion 174 at a predetermined interval in the left-right direction.

Figure 8:
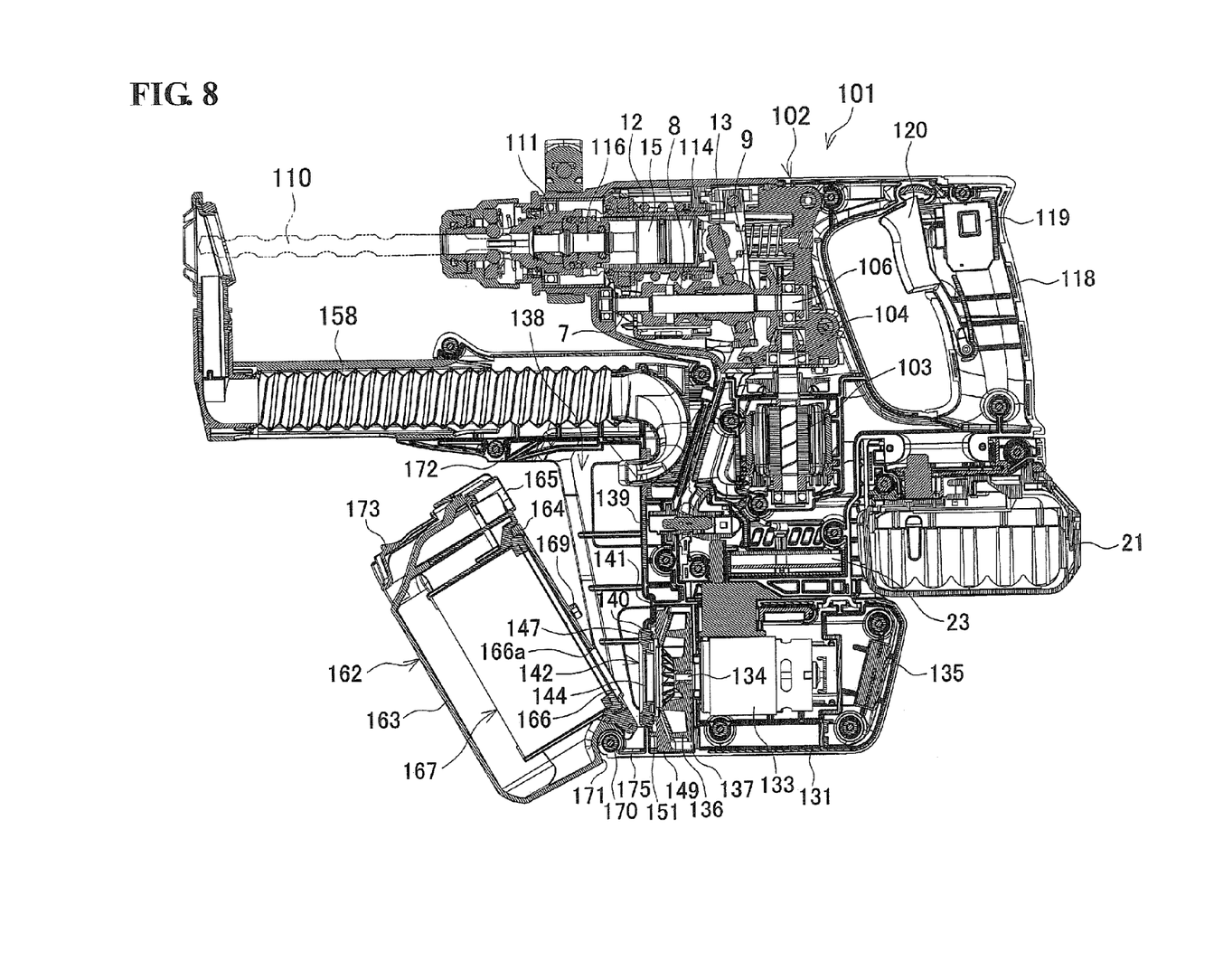
FIG. 8 is a vertical cross-sectional view of the hammer drill on which is mounted the power tool dust collecting device of the second embodiment (in a state in which the dust box is not coupled).

With the hammer drill 101 and the dust collecting device 130 configured in the manner described above, first, when the dust box 162 is mounted on the dust collecting device 130, the groove 171 fits with the bearing shaft 170 from the front, and is inserted into the coupling portion 138 such that the dust box 162 rises up vertically, as shown in FIG. 8. Consequently, the latching piece 173 latches with the latching protrusion 172 and the dust box 162 is mounted on the coupling portion 138, as shown in FIG. 4 and FIG. 5. In this mounted state, the leading end portion 160 of the duct 159 fits with the inlet 165 and protrudes inside the box body 163, and the outlet 166 faces the communicating hole 140. At the same time, the rib 169 is inserted into the recessed portion 141 of the partition wall 139.

Further, in the state in which the dust box 162 is mounted, the protrusion 147 of the seal ring 142 provided in the communicating hole 140 is pressed into the lid 164 so as to cover the outer periphery of the outlet 166, which provides a seal between the partition 139 and the lid 164.

When the dust collecting device 130 is mounted on the hammer drill 101, in a state in which the lower portion of the mounting portion 22 of the hammer drill 101 is aligned with the guide rails 131a of the casing 131 and the mounting portion 22 is positioned above the rear portion of the casing 131, the dust collecting device 130 is slid toward the rear such that the engagement recess portion 32 is engaged with the mounting portion 22 from the front. Then, the pressure rail 154 of the dust collecting device 130 is engaged with the guiding groove 24 of the mounting portion 22 and slides to the rear, and the protrusion of each of the guide rails 131a is engaged with the coupling groove and slides to the rear. Further, the pressure rail 154 comes into contact with the pressing piece 27, and the inclined surface of the pressure rail 154 pushes the pressing piece 27 in the upward direction, thus moving the connector 25 to the connected position in which the shutter portion 26 withdraws in the upward direction and the opening is positioned directly behind the socket 28.

After that, the male terminals 153 of the dust collecting device 130 enter into the housing 102 from the opened socket 28, and simultaneously with the mounting portion 22 being engage with the engagement recess portion 32, the male terminals 153 are inserted into the female terminals and are thus electrically connected (refer to FIG. 5 and FIG. 6).

After the dust collecting device 130 is mounted in this manner, when the switch 119 is switched on by depressing and operating the switch lever 120 of the hammer drill 101, the motor 103 is driven and rotates the countershaft 106. At that time, by sliding operation of the clutch 8 from the outside of the housing 102, one of positions among a forward position, a backward position and an intermediate position can be selected. In the forward position, the clutch 8 only engages with the first gear 7, and in the backward position the clutch 8 only engages with the boss sleeve 9. Further, in the intermediate position, clutch 8 engages with the first gear 7 and the boss sleeve 9 simultaneously. In other words, selection can be made among one of three modes, which are a drill mode, a hammer mode and an interlocked mode. In the drill mode, the tool holder 111 is rotated via the second gear 17 and causes the bit 110 to rotate, and in a hammer mode, the piston cylinder 12 moves reciprocatingly by oscillation of the arm 13 and the interlocked striker 15 strikes the bit 110 via the impact bolt 116. In the hammer drill mode, the rotation of the tool holder 111 and the striking of the bit 110 are performed simultaneously.

While the switch 119 is on, the controller 23 supplies power to the controller 135 of the dust collecting device 130. Consequently, the controller 135 drives the motor 133 and rotates the dust collecting fan 136. Then, sucked air from outside through the suction opening 157 of the nozzle 156 passes the flexible hose 158 and the duct 159 and is lead into the dust box 162 from the exhaust outlets 161. After that, the air passes to the front side of the filter unit 167 and passes from the filter surface 168 through the filter. Then, the air reaches the air intake chamber 137 from the outlet 166 via the communicating hole 140, and is discharged to the outside from an air vent provided in the air intake chamber 137. Thus, the dust arising from the material being processed is sucked up by the suction opening 157 and enters into the dust box 162 via the nozzle 156, the flexible hose 158 and the duct 159. There, the dust is trapped by the filter and retained in the box body 163.

When the switch 119 is switched off by release of the pushing of the switch lever 120, the motor 103 stops being driven and the bit 110 etc. stops rotating. However, as the controller 23 has a delay function, a delay in cutting off the power to the dust collecting device 130 occurs for a few seconds after switching off the switch 119. Thus, in the dust collecting device 130, the dust collecting fan 136 continues to rotate for a few seconds after the bit has stopped. As a result, the dust remaining in the nozzle 156 and the flexible hose 158 etc. can also be reliably collected by the dust box 162.

To remove the dust collecting device 130, an operation should be made in reverse to the time of mounting of the dust collecting device 130. When the dust collecting device 130 is slid toward the front from the hammer drill 101, the dust collecting device is moved toward the front by the pressure rail 154 being guided by the guiding groove 24 and the protrusion being guided by the coupling groove. In this way, the male terminals 153 are separated from the connector 25 and are pulled out of the socket 28. After that, the pressing up of the pressing piece 27 is released due to the pressure rail 154 moving toward the front, and the connector 25 is restored to the non-connected position by the urging of the torsion spring, and the shutter portion 26 once more closes the socket 28.

Further, when the dust box 162 is removed from the dust collecting device 130, in reverse to the time of mounting, if the dust box 162 is tipped in a direction away from the coupling portion 138 around the bearing shaft 170 in a state in which the latching piece 173 is removed from the latching protrusion 172, the dust box 162 is separated from the coupling portion 138 as shown in FIG. 8, and can be removed as it is. At this time of removal, even if dust that has gathered on the inlet 165 spills and falls off, the dust is received and stopped by the rib 169 of the lid 164, and there is thus a reduced risk that the dust will enter into the filter unit 167 side from the outlet 166. In particular, the standing portion 166a is provided on the outlet 166, and it is thus even more difficult for the dust to enter. In addition, even if the dust falls from the rib 169 onto the support portion 174, it is discharged to the outside via the discharge holes 175, and almost no dust remains in the coupling portion 138.

According to the dust collecting device 130 and the hammer drill 101 of the above-described second embodiment, the seal ring 142, which forms a seal between the air intake opening 152 and the outlet 166 by coming into contact with the periphery of the outlet 166 when the dust box 162 is in a coupled state, is provided on the air intake opening 152 of the air intake chamber 137 of the dust collecting device 130. Therefore, even if the seal ring 142 deteriorates or is damaged, only replacement of the seal ring 142 is needed. As a result, a cost of the dust box 162 is suppressed and a frequency of replacement of the dust box 162 is reduced.

In particular, here, as the seal ring 142 is provided so as to be urged in a direction of protrusion toward the outlet 166 side, seal performance between the air intake opening 152 and the outlet 166 improves.

Furthermore, the lid 164 in which the outlet 166 is formed and which comes into contact with the seal ring 142 in the coupled state is provided on the dust box 162, a contact state of the seal ring 142 is stable and improved seal performance can be expected.

Further, the standing portion 166a is formed around the whole circumference of the circumferential edge of the outlet 166 such that it protrudes toward the air intake opening 152, which reduces a risk of dust entering from the outlet 166.

In addition, the wire mesh 144 is provided in the opening of the seal ring 142, and dust and the like is prevented from entering into the air intake chamber 137.

The coupling portion 138 is formed in the up-down direction and the inlet 165 and the outlet 166 of the dust box 162 are arranged separated in the up-down direction in a surface of the dust box 162 facing the coupling portion 138. On the facing surface, the rib 169 is formed as a partition between the inlet 165 and the outlet 166 such that it protrudes from the facing surface. The rib 169 has a greater length than the outlet 166 and thus, when the dust box 162 is removed from the coupling portion 138, the dust is blocked by the rib 169 and a risk of the dust entering the outlet 166 is reduced, even if dust spills out and falls from the inlet 165 . . .

Further, the coupling portion 138 is formed in the up-down direction, and the support portion 174 supporting the underneath surface of the dust box 162 is provided in the lower portion of the coupling portion 138. At the same time, the dust discharge holes 175 are formed in the support portion 174, and dust from accumulating on the support portion 174 can be reduced.

It should be noted that the shape of the seal member is not limited to that of the above-described second embodiment, and changes are possible, such as increasing the number of concentric protrusions or omitting the wire mesh and so on. Further, an attachment structure to the communicating hole is also not limited to the mode in which the flange is latched from the air intake chamber side and urged to protrude by the separate rubber ring. For example, the attachment may be performed by providing a groove around the outer periphery of a rubber seal ring and fitting the inner peripheral edge of the communicating hole into the groove.

On the side of the dust box also, the shape of the rib can be changed as appropriate, and the rib need not necessarily have an arc shape but a gable shape, or a plurality of ribs may be formed in the up-down direction, for example. The rib may also be omitted. In a similar manner, a protrusion amount of the standing portion of the outlet may be increased and the standing portion may be caused to come into contact with the seal member, or the standing portion may be omitted. Additionally, the structure is not limited to that in which the dust box is coupled to the coupling portion in the up-down direction, and an orientation of the coupling or the coupling structure is not limited to those of the above-described second embodiment. The dust box may be coupled, for example, to a coupling portion provided in the left-right direction on an underneath surface of a power tool.

A mode of the hammer drill can also be changed. In addition to changes in an arrangement of the motor and the battery pack, the connector may be provided such that it can slide between the connected position and the non-connected position in the up-down direction or in the left-right direction rather than rotating, or can be urged to the non-connected position by an urging unit, such as a coil spring or a plate spring etc. The supply of power to the dust collecting device can also be changed as appropriate, and a relationship between the male terminals and the female terminals may be reversed, and instead of inserting the terminals, terminal portions may be provided that mutually come into contact with the coupling portion of the mounting portion and the engagement recess portion. It goes without saying that the power tool is not limited to the hammer drill, and the present invention can be applied to another power tool, such as a power drill, as long as the dust collecting device is mountable.

What is claimed is:

1. A power tool dust collecting device comprising:
    a housing mountable on the power tool;
    a suction opening protrudingly provided in the housing;
    a motor housed in the housing;
    a fan chamber which is formed in the housing and which houses a fan that rotates in accordance with driving of the motor;
    a dust collecting chamber which is formed in the housing on an upstream side of the fan chamber and in which is mounted a filter through which passes air that is sucked up from the suction opening due to rotation of the fan and which collects dust in the air; and
    an air pumping unit which is provided inside the housing, which pumps air from a downstream side toward an upstream side of the filter, and which includes a shutter member operable to close a discharge opening of the fan chamber.

2. The power tool dust collecting device according to claim 1, wherein the air pumping unit is provided on the downstream side of the filter.

3. The power tool dust collecting device according to claim 1, wherein the air pumping unit is formed of a pressurizing unit that pressurizes the fan chamber.

4. The power tool dust collecting device according to claim 3, wherein the pressurizing unit is formed of an accordion-shaped pump which is expandable and compressable and the pump pumps air into the fan chamber by compression.

5. The power tool dust collecting device according to claim 3, wherein an operation unit is provided that allows the expanding and compressing of the pump to be operated from outside of the housing, and the shutter member is movable to a closed position of the discharge opening in concert with the compression operation of the pump by the operation unit.

6. The power tool dust collecting device according to claim 4, wherein
    an interior of the housing is divided, by a partition member, into the fan chamber and a motor housing chamber that houses the motor on a downstream side of the fan chamber, and the pump is provided in the motor housing chamber, and
    an air exhaust outlet provided on a front end of the pump is fitted into an opening that is opened in the partition member and that communicatively links the motor housing chamber to the fan chamber.

7. The power tool dust collecting device according to claim 5, wherein the operation unit is an operation plate that is fixed to a rear end of the pump and a leading end of the operation plate protrudes from a slit opened in the housing to the outside of the housing.

8. The power tool dust collecting device according to claim 7, wherein an operation grip is attached to the leading end of the operation plate.

9. The power tool dust collecting device according to claim 7, wherein the shutter member is formed of a horizontal portion extending in a movement direction of the shutter member and a vertical portion provided in a standing manner from the horizontal portion, the shutter member is housed in the motor housing chamber such that the horizontal portion is movable to the closed position by penetrating the partition member below the pump, the operation plate is connected to the vertical portion via a coil spring, and the horizontal portion penetrates the partition member and moves to the closed position in concert with the compression operation of the pump by the operation plate.

10. A power tool on which is mounted the power tool dust collecting device according to claim 1.

* * * * *